United States Patent [19]

Carlsson

[11] Patent Number: 4,582,627

[45] Date of Patent: Apr. 15, 1986

[54] FLOCCULATING AGENT AND A PROCESS FOR ITS PRODUCTION

[76] Inventor: Olof Carlsson, Tors BÅg 1, 269 00 BÅstad, Sweden

[21] Appl. No.: 673,882

[22] Filed: Nov. 21, 1984

[30] Foreign Application Priority Data

Dec. 9, 1983 [SE] Sweden ................. 8306797

[51] Int. Cl.$^4$ .................. C02F 5/10; B01D 21/01
[52] U.S. Cl. .................. 252/181; 162/164.6; 162/168.3; 162/181.5; 162/181.3; 210/723; 210/728; 210/734; 210/735; 252/175; 525/329.4; 525/344; 525/363; 525/370; 525/371; 528/395
[58] Field of Search ............... 252/175, 181; 528/395; 525/329.4, 344, 363, 370, 371; 210/702, 723, 728, 733, 734, 735; 162/181.2, 181.3, 181.5, 168.2, 168.3, 164.6

[56] References Cited

U.S. PATENT DOCUMENTS

| | | | |
|---|---|---|---|
| 3,235,492 | 2/1966 | Andresen et al. | 252/181 |
| 3,629,229 | 12/1971 | Schmank | 252/175 |
| 3,897,333 | 7/1975 | Field et al. | 162/168.3 |
| 4,435,308 | 3/1984 | Thomas et al. | 252/181 |

FOREIGN PATENT DOCUMENTS

| | | | |
|---|---|---|---|
| 2907354 | 8/1979 | Fed. Rep. of Germany . | |
| 27601 | 8/1973 | Japan | 162/181.2 |
| 372497 | 12/1974 | Sweden . | |
| 1512022 | 5/1978 | United Kingdom . | |

Primary Examiner—Paul Lieberman
Assistant Examiner—Robert A. Wax
Attorney, Agent, or Firm—Merchant, Gould, Smith, Edell, Welter & Schmidt

[57] ABSTRACT

A flocculating agent for use in water purification technology and papermaking technology is described, as well as a process of producing the flocculating agent which is the reaction product of sulphate ion-containing polymeric aluminium hydroxy chloride and one or more cationic polymers preferably selected among polyacrylic amide, polyamide amine and polyethylene imine. The most preferred cationic polymer is polyacrylic amide. The flocculating agent is produced by mixing an aqueous suspension of sulphate ion-containing aluminium polyhydroxy chloride having a solids content of 20–30 parts by weight with 0.3–60 parts by weight of cationic polymer, based upon 100 parts by weight of sulphate ion-containing aluminium polyhydroxy chloride, and by heating the mixture for 2–4 h at a temperature varying from about 80° C. to the boiling point of the mixture.

7 Claims, No Drawings

FLOCCULATING AGENT AND A PROCESS FOR ITS PRODUCTION

The present invention relates generally to a process of producing a flocculating agent and to the flocculating agent thus produced. More particularly, the invention relates to a process of producing a flocculating agent which is especially useful in water purification technology to remove impurities and in papermaking technology as a retention agent and fixing agent for size.

Aluminium sulphate is used as such an agent in water purification technology and papermaking technology. However, aluminium sulphate suffers from the disadvantage that it requires a relatively low pH of about 5.5 to give optimum effect.

In papermaking technology it is also known from the published European patent application No. 0063812 to use, instead of aluminium sulphate, aluminium polyhydroxy chloride having the formula $$Al_n(OH)_mCl_{3n-m}$$

in which the Cl/HO ratio is about 2:1. This aluminium polyhydroxy chloride contains no sulphate anions.

Swedish published application No. 7201333-7 (Publication No. 372,497) discloses the production of a sulphate-containing basic aluminium chloride having the formula $$[Al(OH)_xCl_y(SO_4)_{z/2}]_n$$

in which $x+y+z=3$ and $y+z$ represents a value between 1 and 2 and z a value between 0.02 and 0.3. This sulphate-containing basic aluminium chloride can be used for the purification of wastewater. A combination of aluminium chloride and, for example, a cationic polymer is not disclosed by this Publication.

It is known from German patent specification No. 29 07 354 to use as a retention agent and sizing aid in papermaking technology a basic aluminium chloride having the formula $$Al_n(OH)_mCl_{3n-m}\cdot SO_4$$

wherein $$\frac{100m}{3n} = 50 \pm 5$$

and the anion SO$_4$ is present in a ratio of SO$_4$:Al=0.16.

In the manufacture of paper according to German patent specification No.29 07 354, there are added, besides the above-mentioned basic salt, also conventional additives, such as organic retention agents, such as cationic starch, polyacrylic amide and polyethylene imine. However, these last-mentioned agents are added separately after the above-mentioned basic salt.

Similarly, it is already known from British patent specification No. 1,512,022 to use an unreacted mixture of an inorganic flocculating agent for the treatment of water, for example ferric sulphate or aluminium chlorohydrate, and an organic cationic polymer, such as a polyamide or a polyamine.

Finally, it is also known in papermaking technology to use as a flocculating agent polymeric aluminium hydroxy chloride having the general formula $$Al_a(OH)_b(SO_4)_cCl_{3a-b-2c}$$

in the form of an aqueous essentially saturated solution. The values of a, b and c in the above formula are, for example, $a=13$, $b=34$ and $c=1$. Besides water, the liquid contains about 20–30% by weight, usually about 27% by weight of solids and preferably about 10.5% by weight Al$_2$O$_3$, about 5.4% by weight Al, about 9.0% by weight Cl, and about 2.5% by weight SO$_4$. The pH of the liquid is about 2.6. This flocculating agent is manufactured by the Swedish company AB EKOFLOCK and is marketed und the trade name EKOFLOCK.

The present invention aims at providing a flocculating agent which has been improved in relation to prior art technique and which, for water purification purposes, results in an efficient flocculation of impurities and, in papermaking technology, is an efficient means for fixing sizing agents and for the retention of fillers.

The object of the invention is realised in that there is used, as flocculating agent, the product which is obtained when sulphate ion-containing aluminium polyhydroxy chloride (for the sake of simplicity called polyaluminium chloride hereinafter) is caused to react with at least one cationic polymer.

The characteristic features of the invention will appear from the appended claims.

The polyaluminium chloride in the context of the present invention may, in principle, be any sulphate ion-containing aluminium polyhydroxy chloride, for example the one disclosed by the above-mentioned German patent specification No. 29 07 354, but especially preferred is the polyaluminium chloride which is being marketed under the trade name EKOFLOCK. It should here be mentioned that it has been found important that the polyaluminium chloride contains sulphate anion. If no sulphate anion is included, such as in the aluminium polyhydroxy chloride according to European patent application No. 0063812, the effect according to the invention will not be obtained.

In principle, the cationic polymer according to the present invention may be any cationic polymer, from polymers having a cationic activity of 100% to such as have a charge of about $-5$ mV. It is, however, especially preferred to use as cationic polymer one or more polymers selected among polyacrylic amide, polyamide amine and polyethylene imine. The polymers most preferred in the context of this invention are polyacrylic amide and polyamide amine, especially the first-mentioned one. The amount of cationic polymer added to the polyaluminium chloride solution generally corresponds to about 0.3–60 parts by weight, based upon 100 parts by weight of polyaluminium chloride.

The polyacrylic amides utilised as cationic polymer in the context of this invention have a molecular weight of up to $17\times10^6$, usually $1-17\times10^6$, and frequently are in the form of solids, such as microspheres. Examples of suitable polyacrylic amides are those marketed under the trademark PERCOL by the British company Allied Colloids Limited, such as PERCOL 63, PERCOL 140, PERCOL 292 and PERCOL 455. The amound of polyacrylic amide added to the polyaluminium chloride and caused to react therewith amounts maximally to about 8 parts by weight, based upon 100 parts by weight of polyaluminium chloride since larger amounts will result in too high a viscosity. It is preferred to add the polyacrylic amide in an amount of about 0.35–2.0 parts by weight.

The polyamide amines utilised as cationic polymer in the context of this invention have a molecular weight of about 60,000–100,000. Normally, such polyamide amine is available on the market in the form of a 20–30% by weight aqueous solution which is added, in the context of this invention, in an amount of about 20–200 parts by weight, based upon 100 parts by weight of polyaluminium chloride, to the polyaluminium chloride solution for reaction therewith. Preferably, about 110–200 parts by weight of polyamide amine solution are added. Based upon pure polyamide amine, it is added in an amount of about 4–60 parts by weight, preferably 20–60 parts by weight per 100 parts by weight of polyaluminium chloride, to the 20–30% by weight aqueous solution of polyaluminium chloride, i.e. the polyamide amine is normally added in a greater amount than polyacrylic amide. As an example of a cationic active polyamide amine mention may be made of the polyamide amine which is marketed in the form of an aqueous solution under the trade name ARETIN by the company Kemijski Kombinat "Chromos", Zagreb, Yugoslavia.

As has been mentioned before, also polyethylene imines may be utilised as the cationic polymer in the context of this invention. Polyethylene imine is obtained by polymerisation of ethylene imine in the presence of $H^+$ which acts as a catalyst. Polyethylene imine may be represented by the general formula $(-CH_2CH_2NH-)_n$. During the polymerisation reaction, the ethylene imine also is bonded to some extent to secondary amino groups, whereby a side chain and tertiary amino groups are obtained having a strongly cationic character. In the context of this invention, polyethylene imine is used in quantities corresponding to those given for polyamide amine. Because it is injurious to health, polyethylene amine is less preferred than polyacrylic amide and polyamide amine as cationic polymer in the context of this invention.

It is an important feature of the present invention that the polyaluminium chloride and the cationic polymer are not supplied separately, i.e. added separately to a paper stock or to the water to be purified, as has been done in prior art technique, because this has been found not to give the outstanding results obtained with the present invention. Moreover, the outstanding results according to the invention are not obtained if the polyaluminium chloride and the cationic polymer merely are mixed with one another and then used as flocculating agent. Instead, it is necessary in the context of this invention that the polyaluminium chloride and the cationic polymer are first caused to react chemically with one another to form a reaction product which then is utilised as flocculating agent.

The reaction between the polyaluminium chloride and the cationic polymer is carried out at elevated temperature during a predetermined period of time. Generally, the reaction is carried out at a temperature of from about 80° C. to the boiling point of the reaction mixture, which usually lies at 100°–110° C. The preferred reaction temperature is about 96°–98° C., and most preferred is a temperature of 97° C. The reaction time generally is the time required for obtaining from the original reaction mixture which consists of an aqueous suspension, an essentially clear liquid. The reaction time normally is about 2–4 h, a reaction time of about 3–4 h being preferred, and the reaction time which at present is most preferred is about 3 h.

The chemical reaction which occurs between the polyaluminium chloride and the cationic polymer has so far not been explained but, as has been mentioned above, it has been found that the reaction product has entirely different and superior properties as compared with a composition consisting of a physical mixture of the components.

One of the advantages of the flocculating agent according to the present invention thus is that it need not be added in the same amount as conventional flocculating agents. Tests have shown that an amount as little as $\frac{1}{3}$ of the amount of conventional flocculating agent is sufficient. Furthermore, the flocculating agent according to the invention does not require a low pH to function efficiently. The optimum pH of the flocculating agent according to the invention is 7–7.5, and this should be compared with a pH of 5.5 for conventional aluminium sulphate.

What I claim and desire to protect by Letters Patent is:

1. A process of producing a flocculating agent, characterised in that an aqueous suspension of sulphate ion-containing aluminium polyhydroxy chloride having a solids content of 20–30% by weight is mixed with 0.3–60 parts by weight of cationic polymer, based upon 100 parts by weight of sulphate ion-containing aluminium polyhydroxy chloride, and that the mixture is heated for 2–4 h at a temperature varying from about 80° C. to the boiling point of the mixture.

2. A process as claimed in claim 1, characterised in that the cationic polymer is selected among at least one of polyacrylic amide, polyamide amine and polyethylene imine.

3. A process as claimed in claim 1, characterised in that the cationic polymer consists of polyacrylic amide which is added in an amount of up to 8 parts by weight, based upon 100 parts by weight of sulphate ion-containing aluminium polyhydroxy chloride.

4. A process as claimed in claim 1, characterised in that the cationic polymer consists of polyamide amine which is added in an amount of 4–60 parts by weight, based upon 100 parts by weight of sulphate ion-containing aluminium polyhydroxy chloride.

5. A process as claimed in claim 1, characterised in that the mixture is heated at a temperature of 96°–98° C.

6. A process as claimed in claim 1, characterised in that the mixture is heated for 3–4 h.

7. A flocculating agent, characterised in that it has been produced by the process as claimed in claim 1.

* * * * *